United States Patent
Burton et al.

(10) Patent No.: US 6,282,254 B1
(45) Date of Patent: Aug. 28, 2001

(54) SLIDABLE COMB ASSEMBLY FOR BURNABLE POISON ROD TRANSFER DEVICE

(75) Inventors: Christopher Marc Burton, Pittsburg; David John Stefko, Jeannette; Louis Joseph Tylman, Trafford, all of PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/362,005

(22) Filed: Jul. 27, 1999

(51) Int. Cl.[7] .................................................. G21C 19/10
(52) U.S. Cl. ..................... 376/262; 376/260; 376/261; 376/264; 376/268; 376/272; 269/56; 269/37
(58) Field of Search ...................................... 376/260, 261, 376/264, 268, 272, 262; 294/906; 269/56, 37; 248/913; 252/636

(56) References Cited

U.S. PATENT DOCUMENTS

| | | | |
|---|---|---|---|
| 3,941,413 | * 3/1976 | Johnson et al. | 294/86 A |
| 4,374,801 | * 2/1983 | Albin | 376/264 |
| 4,650,606 | * 3/1987 | Yamamoto | 252/626 |
| 4,697,322 | * 10/1987 | Knecht et al. | 29/402.03 |
| 4,772,446 | * 9/1988 | Meuschke | 376/262 |
| 4,793,962 | * 12/1988 | Tsitsichvili | 376/261 |
| 4,981,640 | * 1/1991 | Beneck et al. | 376/261 |
| 5,227,125 | * 7/1993 | Beneck et al. | 376/260 |
| 5,325,408 | * 6/1994 | Hornak et al. | 376/260 |
| 5,325,409 | * 6/1994 | Yaginuma | 376/261 |
| 5,425,070 | * 6/1995 | Gosnell et al. | 376/260 |
| 5,699,393 | * 12/1997 | Picard et al. | 376/261 |

* cited by examiner

Primary Examiner—Charles T. Jordan
Assistant Examiner—John Richardson

(57) ABSTRACT

A transfer device for moving a poison rod assembly between fuel cells in a nuclear fuel storage facility, where the poison rod assembly has a plurality of poison rods depending from a web. The transfer device includes a frame assembly, a poison rod assembly lifting assembly, which is moveable between an upper position and a lower position, a plurality of comb assemblies. The comb assemblies are slidably mounted on the frame so that the comb assemblies slide between an open position and a closed position as the lifting assembly moves from its lower position to its upper position.

29 Claims, 14 Drawing Sheets

SLIDABLE COMB ASSEMBLY FOR BURNABLE POISON ROD TRANSFER DEVICE

CROSS REFERENCES TO RELATED APPLICATION

This application is related to commonly owned, concurrently filed patent application Ser. No. 09/362,004, "INTERLOCK ASSEMBLY FOR BURNABLE POISON ROD TRANSFER DEVICE."

BACKGROUND OF THE INVENTION

1. Field of the Invention

This invention relates to a device for transporting poison rod assemblies between fuel assemblies in a nuclear fuel storage facility and, more specifically, to a device for transferring a poison rod assembly which has a plurality of poison rod guide combs which are slidable between an open position, where the combs are in an upper spaced apart location, and a closed position, where the combs overlap and are located near the bottom of the device.

2. Description of the Prior Art

Fuel for a nuclear reactor used to create steam and, ultimately, electricity, generally is in the form of fuel rods containing a fissile material. When fuel rods are being stored, the fuel rods are typically supported in nuclear fuel assemblies arranged as spaced parallel arrays. Fuel assemblies are stored in racks in a protective medium, such as water containing boric acid. In addition to the fuel rods, poison rods are disbursed throughout the fuel assemblies to control the fission process. Poison rods generally include a plurality of elongated rods, each containing a neutron absorbent material, which fit in longitudinal openings, or thimbles, defined in the fuel assemblies. The top end of each poison rod is attached to a web thereby forming a poison rod assembly. A T-shaped bar is affixed to the top of the web, creating an easily accessible handle for lifting the poison rod assembly so that it may be transferred from one fuel assembly to another.

Because the poison rods, which are approximately 12 ft. long, are only connected by the web located at the top of the poison rod assembly, the lower end of the poison rods move freely, and, as such, can be difficult to reinsert within a second fuel assembly without the aid of an alignment means. Prior art transfer devices provide comb assemblies as an alignment means. A comb assembly consists of at least two plates having slots corresponding to the rows of poison rods in the poison rod assembly. The plates are oriented at 90 degrees to each other. As such, when the plates are positioned on top of each other, a grid is formed with an opening for a poison rod at each intersection of the slots. To provide extra stability, comb assemblies typically have two spaced grids. Each comb grid is typically formed of four plates, two plates with channels extending in one direction and two plates with channels extending in a perpendicular direction. Each plate will provide support for half of the poison rods. The plates are divided so that the comb assemblies may be moved aside while the web portion of the poison rod assembly is being lifted from the fuel assembly. Once the web portion of the poison rod assembly is above the comb assemblies, the comb assemblies are brought into place, providing support and guidance for the poison rods.

As shown in Hornak et al., U.S. Pat. No. 5,325,408, comb assemblies may be located on pivots attached to a frame. The comb assemblies are located near the bottom of the transfer device so as to provide better alignment of the poison rods during reinsertion into a fuel cell. The comb assemblies may be pivoted out of the way during the lifting of a poison rod assembly and pivoted into place once the poison rod assembly web is sufficiently above the location of the comb assemblies. An alternative method of displacing the comb assemblies can be seen in Beneck et al., U.S. Pat. No. 5,227,125. In Beneck the comb assemblies are pivotally mounted in a housing and attached to springs which bias the comb assemblies into a closed position. An inner sleeve displaces the comb assemblies while the poison rod assembly web passes through the housing. As the web rises above the housing, the sleeve is lifted and the springs lift the comb assemblies into place. In both Beneck and Hornak, the comb assemblies are spaced above the lower end of the housing or frame. As such, a portion of each poison rod will extend beyond the alignment comb assemblies and may become misaligned from the thimbles provided in the fuel rod assembly.

Finally, as shown in Hornak, the transfer device consists of a tubular top portion and a bottom frame portion. The frame portion is typically four vertical L-shaped members held in spaced relation by a plurality of horizontal bands. Due to the length of the frame portion of the transfer device, the frame may become distorted during lifting operations. Any such distortion interferes with the movement of the mechanical parts, including the comb assemblies, of the transfer device.

Therefore, there is a need for a poison rod transfer device having comb assemblies located near the bottom of the transfer device to provide proper alignment between the poison rod assembly and the fuel cell thimbles.

There is a further need for a poison rod transfer device with a frame that cannot be distorted.

SUMMARY OF THE INVENTION

The present invention satisfies the above referenced needs and others by providing a poison rod assembly transfer device having vertically slidable comb assemblies which move between an upper, open, spaced apart position and a lower, closed position proximal to the lower end of the transfer device. The present invention further provides for a frame constructed of C-shaped members held in a spaced relation by cross bands, providing a more rigid structure.

The vertically sliding comb assemblies are mounted within channels on rails. The channels have their upper ends located outside a frame assembly of the transfer device and their lower ends in a pedestal located at the bottom of the transfer device. Thus, when the comb assemblies are located at the top of the channels, the comb assemblies are spaced apart laterally and are outside the frame assembly. When the comb assemblies are located at the bottom of the channel, they are closed, overlapping, and adjacent to the bottom of the transfer device. The comb assemblies are linked by cables to a slide plate. The slide plate cooperates with a pusher plate located on the poison rod assembly lifting assembly. As the lifting assembly descends, the pusher plate contacts the slide plate pushing it downwards. As the slide plate is pushed downwards, it pulls on the cables thereby lifting the comb assemblies. Thus, as the lifting assembly descends, the comb assemblies ascend and become spaced apart outside of the frame. Conversely, when the lifting assembly moves upward, e.g., when lifting a poison rod assembly, the pusher plate no longer holds the slide plate in a lower position and gravity will force the comb assemblies to descend until the comb assemblies reach the bottom of the pedestal. In the pedestal, the comb assemblies will be in their closed position providing support for and aligning the poison rod assembly.

BRIEF DESCRIPTION OF THE DRAWINGS

An understanding of the invention can be gained from the following description of the preferred embodiment when read in conjunction with the accompanying drawings in which:

FIG. 3 is a diagram of the inner member in various positions. Specifically.

FIG. 4 is an elevational view of the lower end of the transfer device. Specifically.

FIG. 5 is a cross-sectional view taken along line 5—5 in FIG. 4a.

FIG. 13 is a detail of the slide plate. Specifically.

DESCRIPTION OF THE PREFERRED EMBODIMENT

Figure 1:
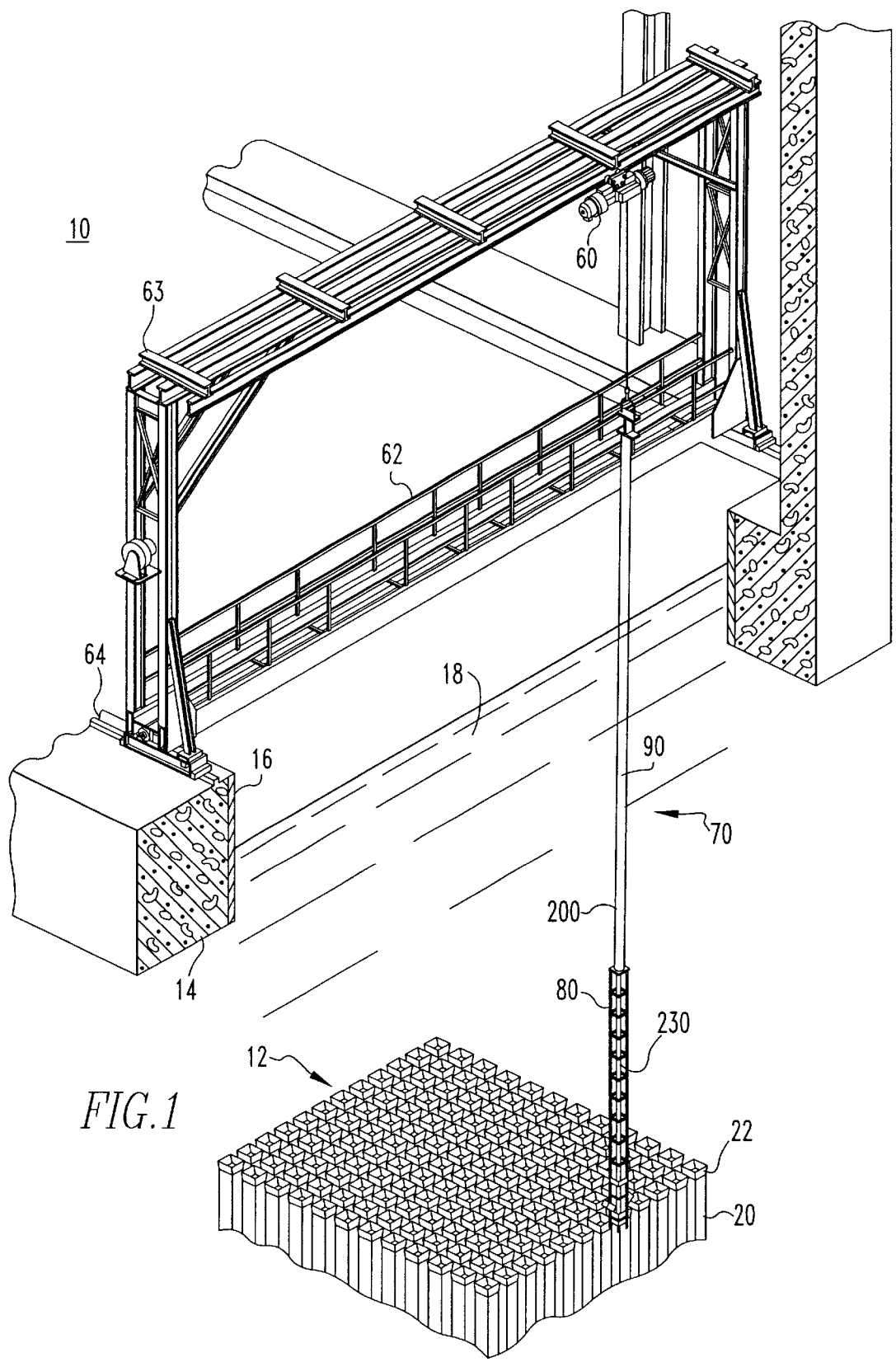
FIG. 1 is a perspective view of a transfer device in a fuel pit.
Figure 2:
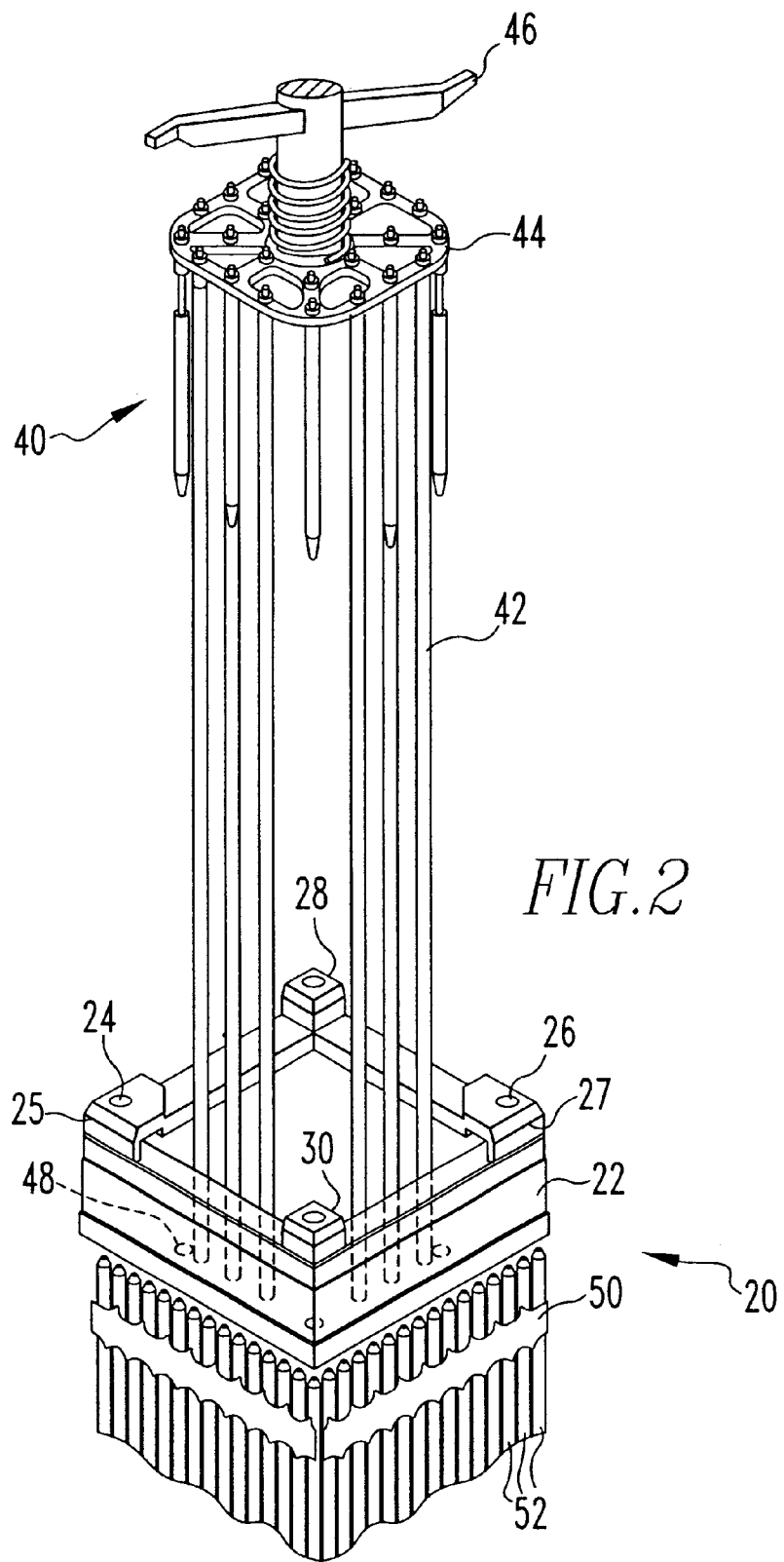
FIG. 2 is a perspective view of a poison rod assembly partially extracted from a fuel cell.

Referring to FIG. 1, there is illustrated a spent fuel pit 10 which contains a plurality of spent nuclear fuel racks 12. The pit 10 is a sealed enclosure comprised of concrete 14 and a sealed metallic liner 16. The spent fuel pit 10 is filled with a shielding medium, such as water containing boric acid 18. Each fuel rack 12 includes a plurality of vertically oriented spaced apart fuel cells 20. Each cell 20 is sized to receive a fuel assembly 50 (described below). Each cell 20 has a metallic can 22 affixed to the top of the cell 20. The can 22 may include a square funnel to guide a fuel assembly 50 into its storage position. As shown in FIG. 2, the can 22 includes two bores 24, 26 in raised plates 25, 27 at diagonally opposite corners. The remaining corners of the can 22 define standoff plates 28, 30.

Referring to FIG. 2, a poison rod assembly 40 is shown partially extracted from a fuel cell 20. Each fuel assembly 50 is formed in part from fuel rods 52 which are intermixed with poison rods 42. The fuel rods 52 are generally positioned on the periphery of the fuel assembly 50 and the poison rods 42 are generally positioned in an inner portion of the fuel assembly 50. The poison rods 42 are joined at their top portions by a support web 44. A T-shaped bar 46 is attached to the support web 44 extending upwardly, forming an easily accessible handle for lifting the poison rod assembly 40. When the poison rod assembly 40 is positioned within the fuel assembly 50, each poison rod 42 is disposed within a thimble 48 mounted in the fuel assembly 50.

Referring to FIG. 1, a poison rod assembly transfer device 70 of the present invention is illustrated within a spent fuel pit 10. The transfer device 70 is suspended within the spent fuel pit 10 by an overhead crane 60. The overhead crane 60 is coupled to a moveable walkway 62 and gantry 63. The moveable walkway 62 and gantry 63 are mounted on walkway rails 64 located above the water line 18 of the spent fuel pit 10. The crane 60, moveable walkway 62 and gantry 63 are used to lift the transfer device 70 and a poison rod assembly 40 and move them between fuel cells 20. The transfer device 70 is seated on a fuel cell 20 and attached to a poison rod assembly 40 as detailed below.

Figure 3A:
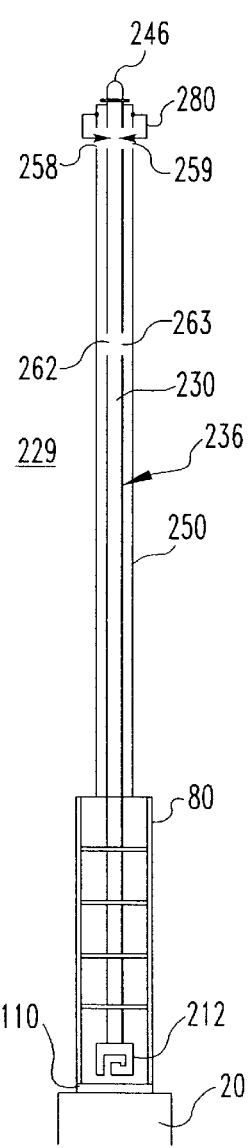
FIG. 3a shows the inner member in the lower position.
Figure 3B:
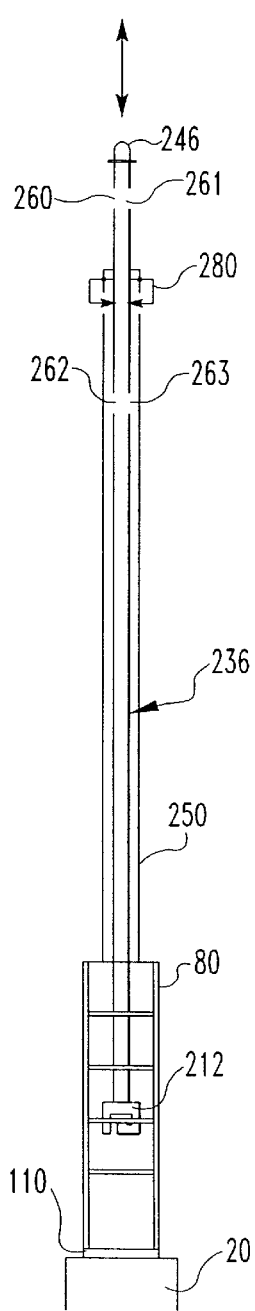
FIG. 3b shows the inner member in an intermediate position.
Figure 3C:
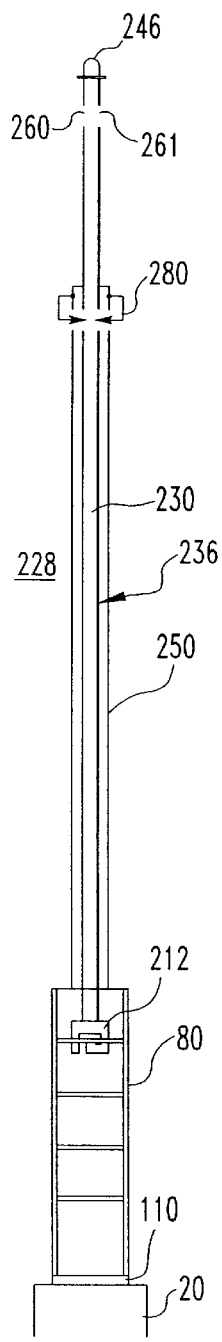
FIG. 3c shows the inner member in the upper position.

As shown in FIGS. 3, 4a, 4b and 5, the transfer device 70 includes an outer member 200 that is divided into two portions, a frame assembly 80, located at the lower end of the transfer device 70, and an upper portion 90. In the preferred embodiment, the upper portion 90 is tubular, including an inner tubular member 230 and outer tubular member 250, described in detail below. Generally, and as will be described in detail below, the frame assembly 80 is fixed to the fixed outer tubular member 250 of upper portion 90. The frame assembly 80 and the outer tubular member 250 are of an appropriate length so that the top of the outer tubular member 250 is adjacent to the walkway 62 when the transfer device 70 is seated on a fuel cell 20. An inner tubular member 230 is slidably disposed within the outer tubular member 250 and supports a gripper assembly 210. Gripper assembly 210 is disposed within the frame assembly 80. As shown in FIG. 3, the inner tubular member 230 may be raised and lowered between an upper position 228 and a lower position 229 by a winch (not shown) as described in Hornak et al., U.S. Pat. No. 5,325,408. Alternatively, inner tubular member 230 and outer tubular member 250 may be linked by an interlock device 280 as described in attorney docket number NSD 98-004A, filed concurrently herewith. When an interlock device 280 is used, the interlock device 280 locks the inner tubular member 230 in either an upper position 228 or a lower position 229. The inner tubular member 230 is attached to the crane 60 so that, when the inner tubular member 230 is not locked in place, and the crane 60 is raised, frame 80 and outer tubular member 250 remain stationary and inner tubular member 230 and gripper assembly 210 move vertically. When the interlock device 280 is engaged, however inner tubular member 230 is locked to outer tubular member 250 and raising the crane 60 raises the entire transfer device 70.

Thus, lifting of a poison rod assembly 40 is accomplished by an operator using crane 60 to position the transfer device 70 over a fuel cell 20 containing a poison rod assembly 40. Once the transfer device 70 is seated on the fuel cell 20, the operator lowers inner tubular member 230 and gripper assembly 210 until the gripper assembly 210 engages the T-bar 46 of the poison rod assembly 40. When the gripper assembly 210 has engaged the T-bar 46, the operator lifts inner tubular member 230, gripper assembly 210 and the poison rod assembly 70. Once the poison rod assembly 40 is withdrawn from fuel cell 20, the operator may lift the transfer device 70 off fuel cell 20 and use the moveable gantry 63 to reposition the crane 60 and transfer device 70 above another fuel cell 20. The transfer device 70 is lowered onto a second fuel cell 20 and, with the assistance of comb assemblies 120, the poison rod assembly 40 can be guided into the new fuel cell 20. When the poison rod assembly 40 is positioned within the second fuel cell 20, the gripper assembly 210 is disengaged from the poison rod assembly 40 and the transfer device 70 removed.

As shown in FIG. 4a, 4b, 4c and 5, the frame assembly 80 includes two C-members 82, 84 held in spaced relation by a plurality of braces 86. The C-members 82, 84 define a, preferably square, frame cavity 88. Each C-member 82, 84 has an upper end 92, located at frame assembly upper end 91, and a lower end 94, 96 located at frame assembly lower end 95. At the lower end 94, 96 of the C-members 82, 84 is a mounting plate 100. Mounting plate 100 has an upper surface 102, an opening 104 and a lower surface 106. The C-members 82, 84 are attached to the mounting plate upper surface 102. The mounting plate opening 104 communicates with the frame cavity 88.

The frame assembly 80 further includes a square pedestal 110 attached to the mounting plate lower surface 106. The pedestal 110 has an upper surface 111, a lower surface 112 with openings 113, 114 therethrough. The upper surface pedestal opening 113 and lower surface pedestal opening 114 are sized to allow the poison rod assembly 40 to pass therethrough. The upper surface pedestal opening 113 communicates with the mounting plate opening 104. In operation, the poison rod assembly 40 will be lifted through the pedestal 110 and mounting plate 100 by gripper assembly 210 into a position within the frame cavity 88. The pedestal lower surface 112 has at least one projection 116. In the preferred embodiment, there are two pedestal projections 116 extending downwardly from diagonally opposite corners. The projections 116 are sized to engage the bore holes 24, 26 on the fuel rod assembly can 22. Thus, mounting of the transfer device 70 is accomplished by the operator lowering the device 70 until projections 116 are seated within bore holes 24, 26. Once the projections 116 are so seated, the transfer device 70 is resting on the fuel cell 20.

Figure 6:
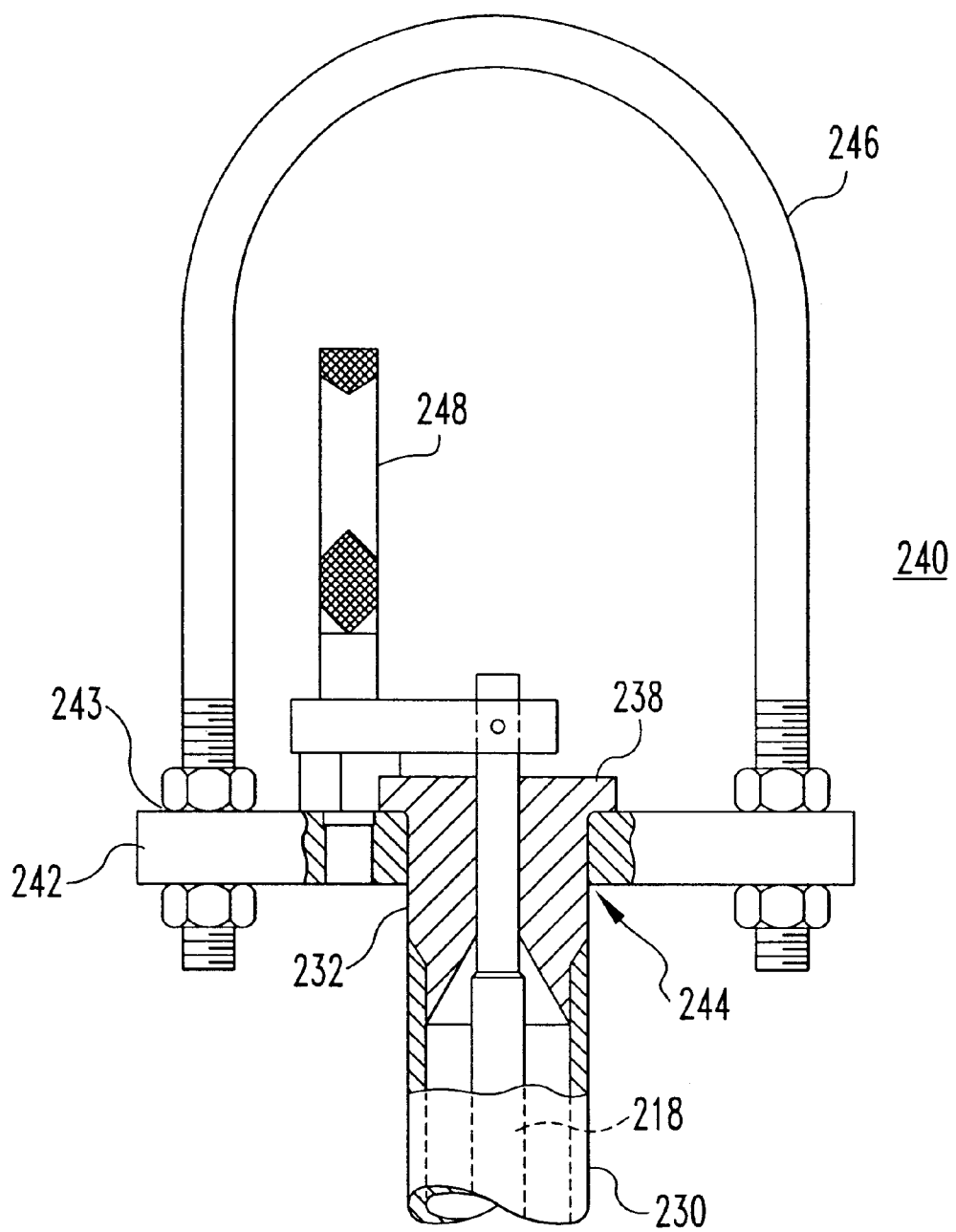
FIG. 6 is an elevational view of the lifting platform.

Once the transfer device 70 is seated on a fuel cell 20, removal of the poison rod assembly 40 can be performed by the lifting assembly 220. The lifting assembly 220 includes an outer tubular member 250, an inner tubular member 230, a platform 240, and a gripper assembly 210. Outer tubular member 250 is fixed at its lower end 252 to frame 80. Thus, when the transfer device 70 is seated on a fuel cell 20, frame 80 and, therefore outer tubular member 250, are fixed in place. As shown in FIG. 6, a platform 240 is mounted at the upper end 232 of inner tubular member 230. The lifting platform 240 may include a winch (not shown) to raise and lower the inner tubular member 230, or the inner tubular member 230 may be coupled directly to crane 60 by bail 246. As noted above, inner tubular member 230 is slidably disposed within outer tubular member- 250. Thus, as shown diagrammatically in FIG. 3, when frame 80 and outer tubular member 250 are fixed in place, inner tubular member 230 can slide between an upper position 228 and a lower position 229 within outer tubular member 250.

As shown in FIG. 3, in the upper position 228, the inner tubular member 230 is raised so that the gripper 212 (described below) is adjacent to the top of frame 80. In the lower position 229, the gripper 212 is adjacent to the lower end of frame 80, but spaced above pedestal 110.

Figure 7:
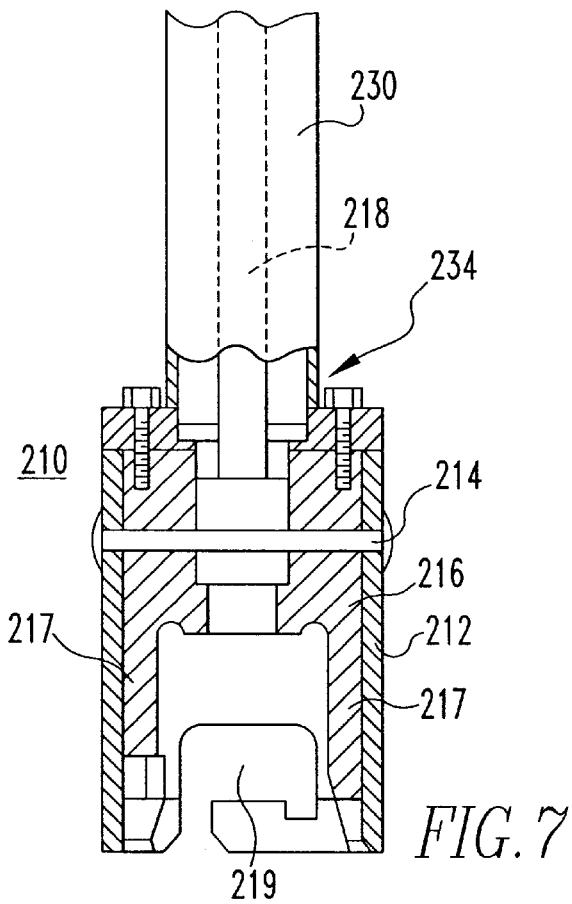
FIG. 7 is a partial cross-sectional view of the gripper.

Coupling the poison rod assembly 40 to the transfer device 70 is accomplished by a gripper assembly 210 located generally at the bottom 234 of inner tubular member 230. As shown in FIG. 7, the gripper assembly 210 includes gripper 212, a connecting pin 214, a base 216 and inner shaft 218. The gripper base 216 is a cylindrical member attached to inner tubular member bottom 234, having a greater diameter than the inner tubular member 230 and having two support fingers 217 extending downwardly from the base 216. The gripper base 216 provides support for the gripper 212 which is rotatably disposed about the gripper base 216. The gripper 212 incorporates two J-shaped notches 219 which are spaced approximately one hundred and eighty degrees apart. The J-shaped notches 219 are used to latch onto the T-bar 46 of the poison rod assembly 40. The gripper 212 is disposed on the gripper base 216 so that the J-shaped notches 219 are between support fingers 217. Inner shaft 218 is rotatably disposed within inner tubular member 230 and extends from the bottom 234 of inner tubular member 230 through the flange 238 located at the top of inner tubular member 230. A connecting pin 214 connects the inner shaft 218 to the gripper 212. As shown in FIG. 6, a handle 248 is attached to the upper end of inner shaft 218 at lifting platform 240. When the gripper 212 is positioned over a poison rod assembly 40 with T-bar 46 disposed within notch 219, the operator rotates handle 248 causing gripper 212 to rotate thereby latching T-bar 46 into J-shaped notches 219.

In operation, the transfer device 70 is seated on a fuel cell 20 as described above. The operator lowers gripper assembly 212 onto the poison rod assembly 40. T-bar 46 will fit into the J-shaped notches 219. The operator then turns handle 248 rotating gripper 212 and latching T-bar 46 in the J-shaped notches 219. The operator then lifts inner tubular member 230, thereby raising gripper assembly 210 and poison rod assembly 40 into frame cavity 88. Once the poison rod assembly is within cavity 88, the operator lifts the transfer device 70 off fuel cell 20 using crane 60. The operator then uses gantry 64 to reposition the transfer device 70 over a different fuel cell 20. The transfer device 70 is then seated on the second fuel cell 20 as described above. Once the transfer device 70 is seated on the second fuel cell, the operator lowers the inner tubular member 230 with the crane 60 or the winch, until poison rod assembly 40 is seated in the new fuel cell 20.

One of the most difficult portions of the transfer procedure is the reinsertion of the poison rod assembly 40 into the new fuel cell 20. Because the poison rods 42 are only held by the support web 44 located at the top of the poison rod assembly 40, the lower end of the poison rods 42 are free to move and sway. Without a means to support and guide the poison rods 42, poison rods 42 will not align properly with the thimbles 48 in the second fuel cell 20. To aid in the alignment of the poison rods 42, comb assemblies 120 are used.

Figure 8:
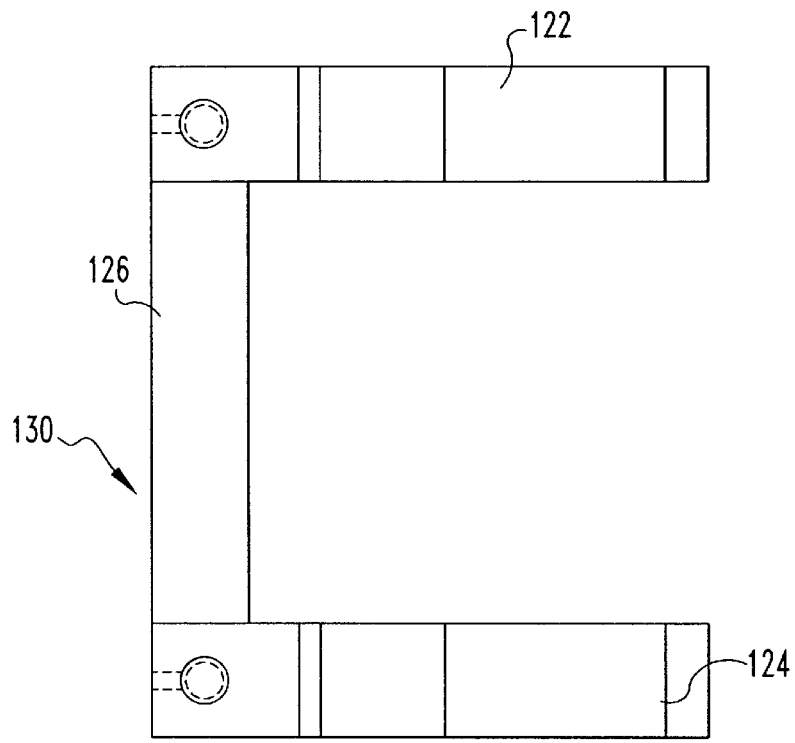
FIG. 8 is an elevational view of a comb assembly.
Figure 9:
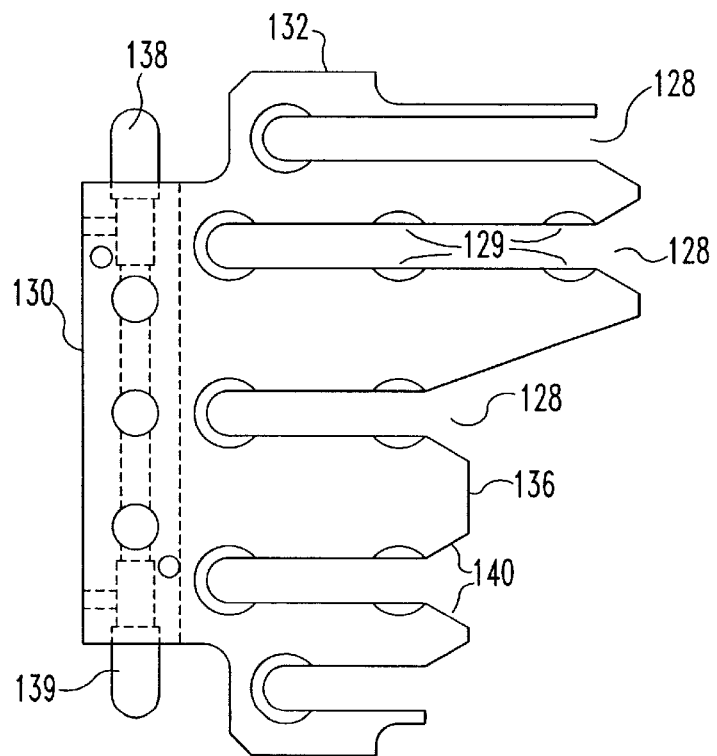
FIG. 9 is a top view of a comb assembly.

As shown in FIGS. 8 and 9, a comb assembly 120 of the preferred embodiment, consists of two parallel horizontal plates 122, 124 held in spaced relation by a vertical plate 126. Each horizontal plate 122, 124 has a plurality of slots 128 cut therein. The slots 128 are spaced to correspond to the rows of poison rods 42 in a poison rod assembly 40. Each slot also has a cut-out 129, at the location where each poison rod 42 will be disposed when the comb assembly is in its closed position around a poison rod assembly 40. Each horizontal plate 122, 124 has an outer edge 130, two side edges 132, 134, and an inner edge 136. The inner edge 136, may be uneven and communicates with the slots 128. Adjacent to each slot 128, on the inner edge 136 is an angled portion 140, which will assist in guiding the poison rods 42 into the slots. On the side edges 132, 134 of each plate, adjacent to the outer edge 130, are located projections 138, 139 which are disposed in channels 152 described below.

Figure 10:
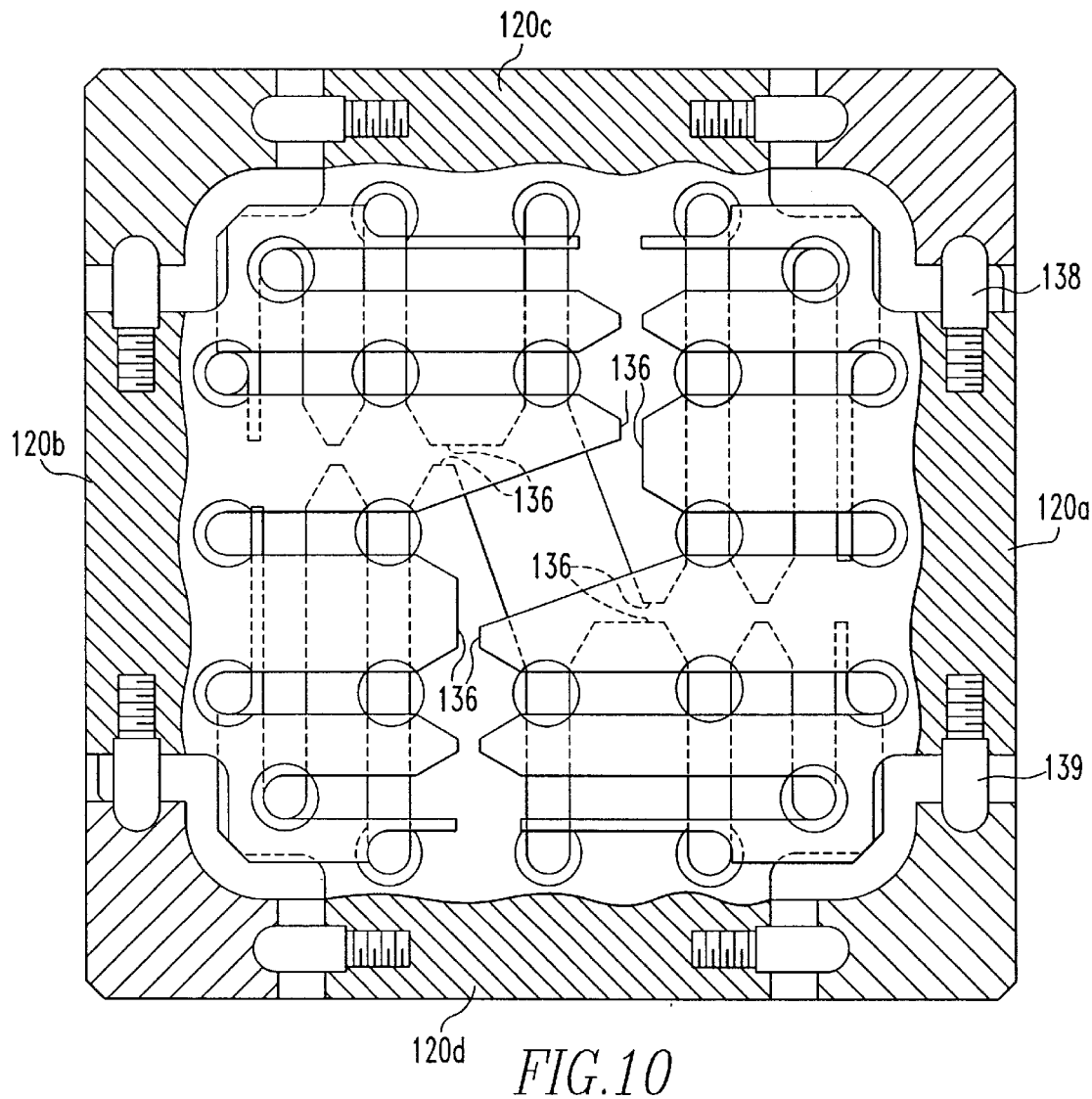
FIG. 10 is a top view of the comb assemblies in the closed position forming a grid.

In the preferred embodiment each horizontal plate 122, 124 covers approximately one half of frame cavity 88. Thus, to provide complete coverage in the closed position (described below), two opposing parallel comb assemblies 120*a*, 120*b* must be used. As shown in FIG. 10, the separate comb assemblies 120*a*, 120*b* are disposed with inner edges 136 abutting each other. This, however, only provides slots 128 extending in a single direction. To align the poison rods 42 and prevent the poison rods 42 from swaying, the comb assemblies slots 128 must form a grid having an opening at each intersection. To form the grid, two additional comb assemblies 129*c*, 129*d* are disposed immediately above or below and perpendicular to comb assemblies 120*a*, 120*b*. Thus, two parallel comb assemblies 120*a*, 129*b* abut each other's inner edge 136 while overlaying a second pair of parallel, abutting comb assemblies 120*c*, 120*d* which are perpendicular to the first pair 120*a*, 120*b*.

Figure 11:
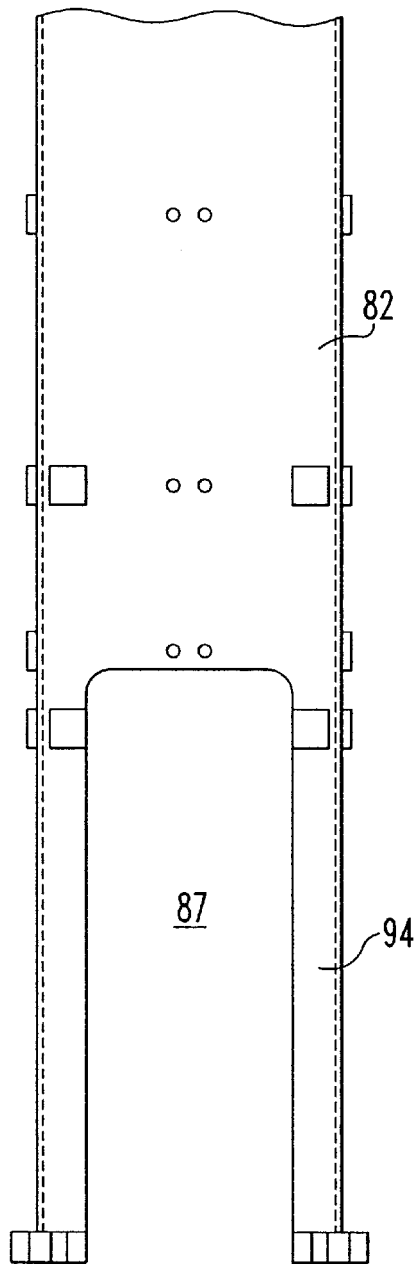
FIG. 11 is a detail view of a C-member lower end.
Figure 12:
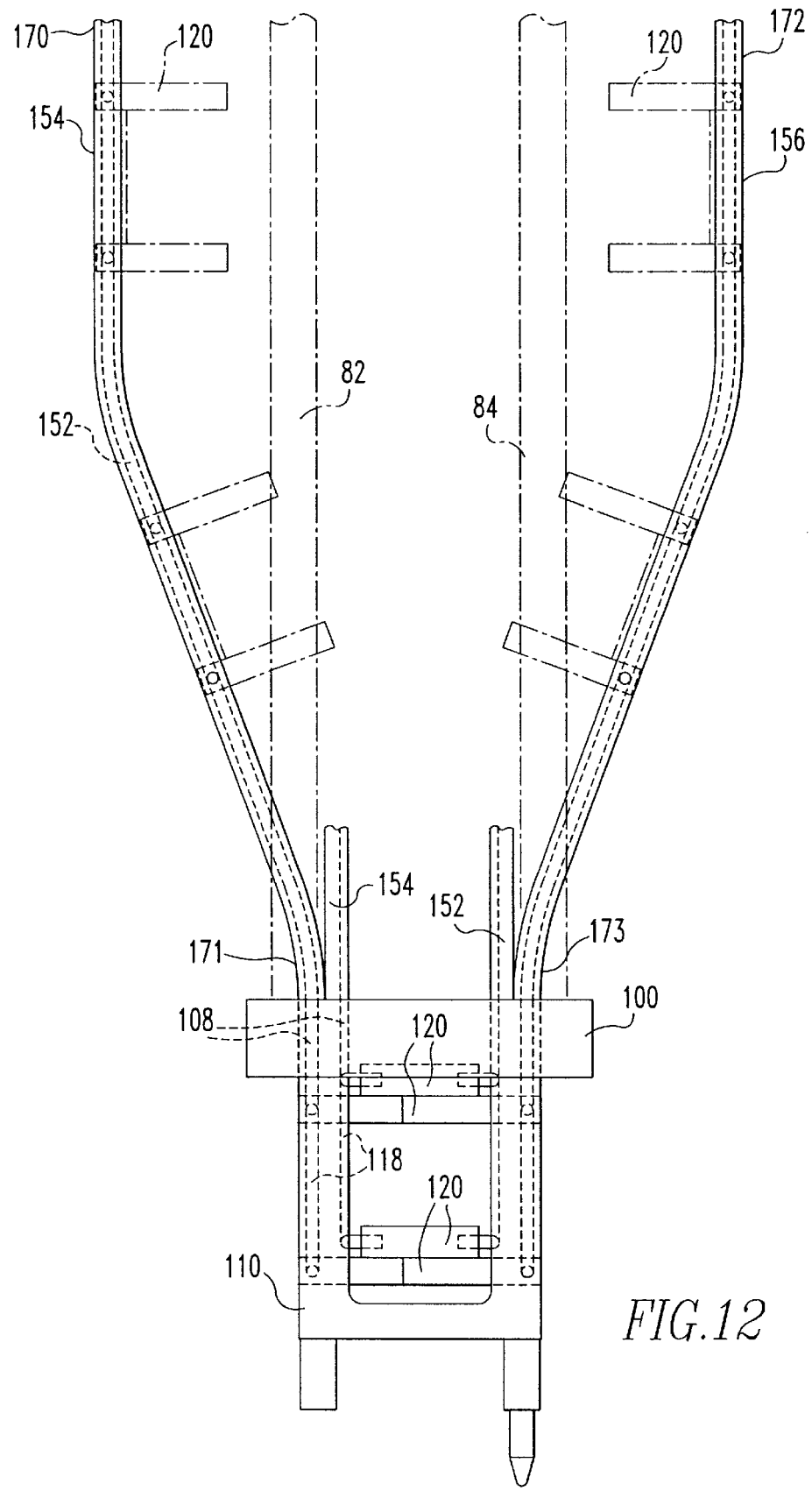
FIG. 12 is a diagram of the comb assembly path of travel.

While there are four comb assemblies 120 on the transfer device 70, one on each side of the square frame 80, each comb assembly 120 is mounted on the frame in a similar manner. As noted above, however, to form a grid when the comb assemblies 120 are in the closed position, two assemblies must overlay the other two. Thus, when disposed within the frame as detailed below, two parallel comb assemblies 120 are disposed immediately above another two parallel comb assemblies 120. The following description will address only one of the four comb assemblies noting that each has a similar mounting assembly. As shown on FIGS. 4*a*, 4*b*, 4*c*, 5, and 12, the comb assembly mounting means includes a plurality of rail assemblies 150 and a comb moving assembly 99. In the preferred embodiment, there are two rail assemblies 150 for each comb assembly 120. Each rail assembly 150 includes two comb rails 154, 156 defining channels 152. The comb rails 154, 156 are attached to the frame 80 by a plurality of mounting bands 158, 159, 160. The mounting bands 158, 159, 160 are attached to spacer assemblies 162, 163, 164, 165 which extend outside the frame 80. The upper end 170, 172 of comb rails 154, 156 are located outside frame 80. The lower end 171, 173 of comb rails 154, 156 curve inward and pass within frame 80. As shown in FIG. 11, the lower end of C-members 82, 84 have cut outs 87 sized to allow a comb assembly 120 to pass therethrough. The lower portion, 171, 173 of comb rails 154, 156 are attached to mounting plate upper surface 102. The mounting plate 100 has channels 108 which communicate with rail channels 152. The mounting plate channels 108 further communicate with channels 118 located in the pedestal 110. Thus, there is a continuous channel from the top of the comb rails 154, 156 to within the pedestal 110. As shown in FIG. 12, comb assembly 120 can travel the length of the channel 152, 108, 118. As the rail assemblies 150 are located outside of the frame 80 at the upper end 170, 172, and inside the frame at the lower end 171, 173, the comb assembly 120 may be disposed in an open position outside the frame 80 while located at the top of the rail assembly 170, 172, or in a closed position within the pedestal 110 when the comb assembly 120 is at the rail lower end 171, 173. As noted above, to form a grid, the comb assemblies 120 must overlay each other in the pedestal. This is accomplished by having certain pedestal channels 118*a*, 118*b*, which are located on opposite sides of pedestal 110, extend downwardly more than pedestal channels 118*c*, 118*d*, which are located on the sides of pedestal 110 perpendicular to channels 118*a*, 118*b*.

As described above, lifting of the poison rod assembly 40 is accomplished by gripper assembly 210. When initiating the lifting of a poison rod assembly 40, the comb assembly 120 must be in the open position where the comb assemblies are located at the rail upper ends 170, 172. When the comb assemblies are in the open position the gripper assembly 210 and poison rod assembly support web 44 may pass through the lower end of the frame assembly 80. When lifting a poison rod assembly 40, the comb assemblies 120 should be lowered into the closed position within the pedestal 110 as soon as the gripper assembly 210 and support web 44 pass through the lower end of frame 80. Movement of the comb assemblies 120 is controlled by a comb moving assembly 99 that is disengagably coupled to the poison rod assembly lifting assembly 220. The comb moving assembly 99 and coupling means includes a pusher plate 180, which is mounted on inner tubular member 230, and a pair of slide plates 270, 271 connected by a plurality of cables 198, 199 to the comb assembly 120.

Figure 4A:
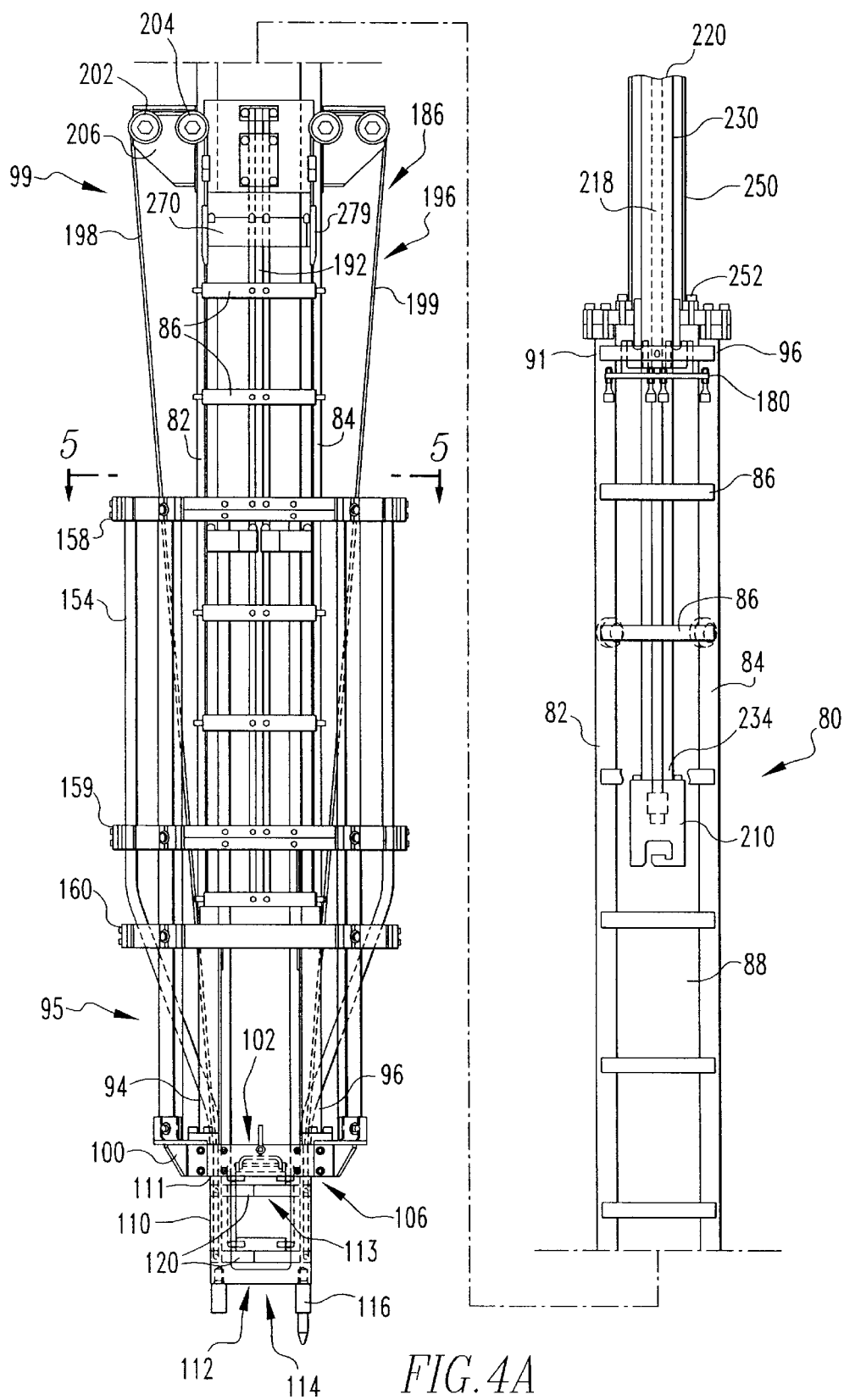
FIG. 4a shows the device with the comb assemblies in the lower position.
Figure 4B:
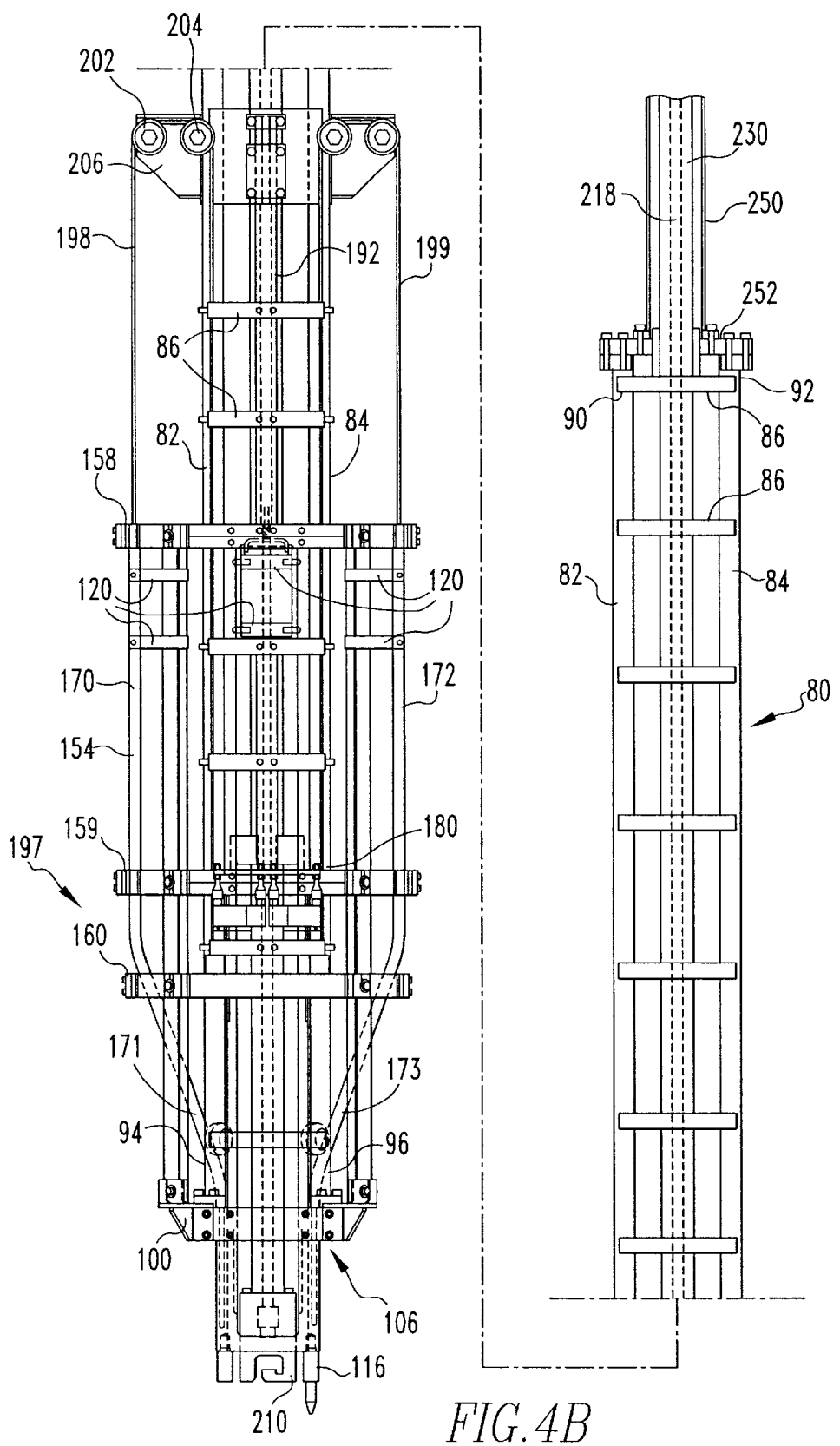
FIG. 4b shows the comb assemblies in the upper position
Figure 4C:
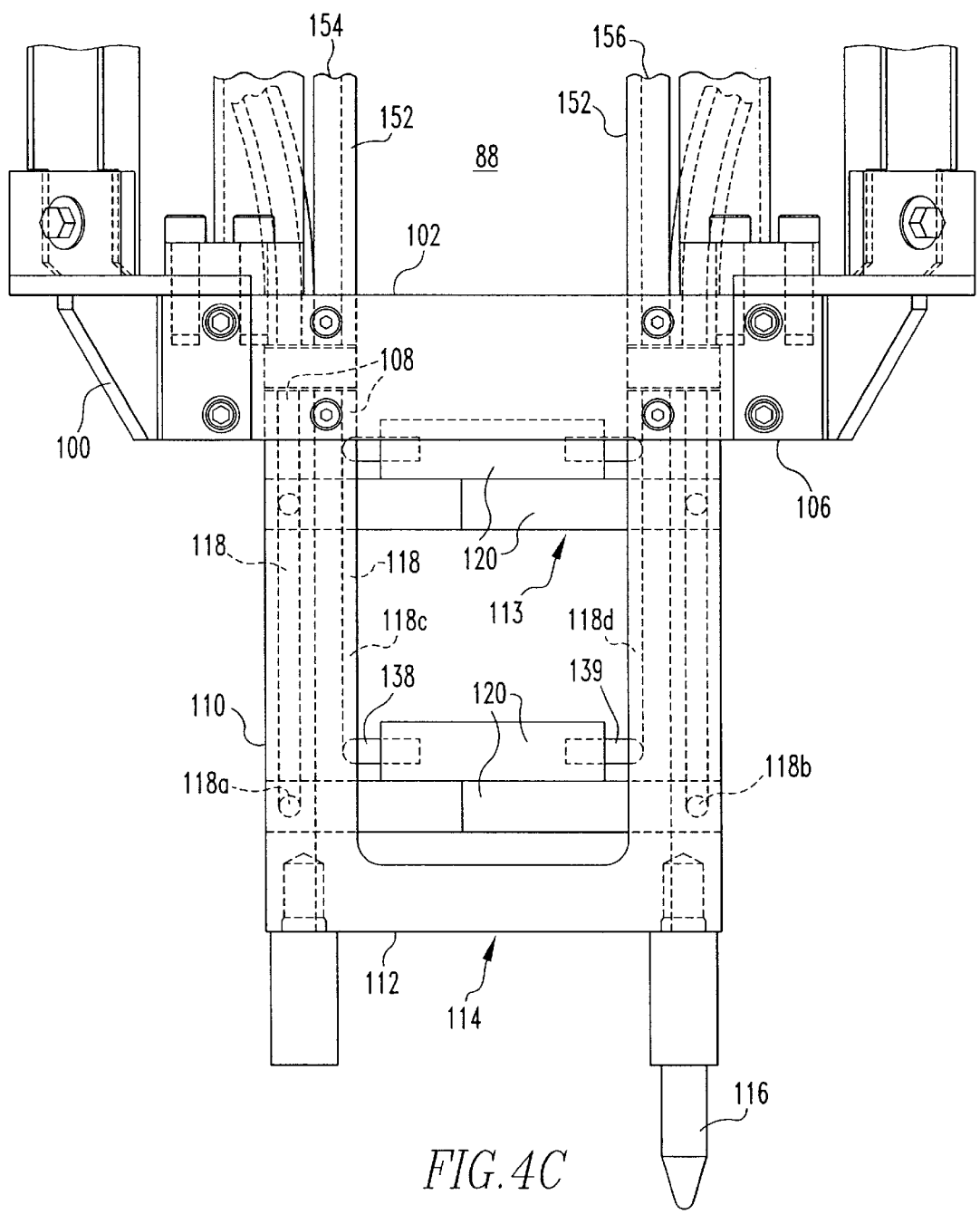
FIG. 4c is a detail of the lower end of the frame assembly.
Figure 5:
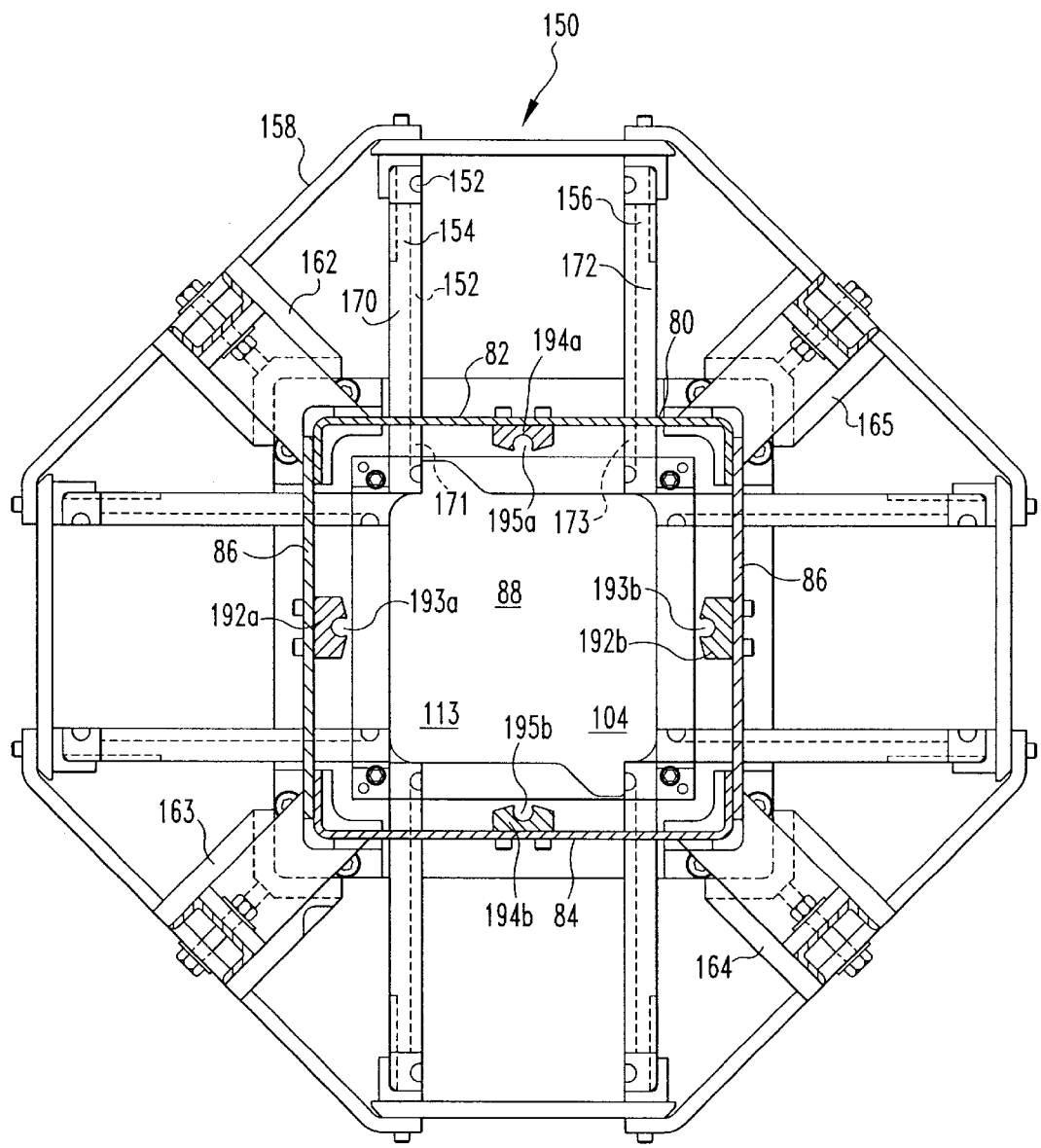
Figure 13A:
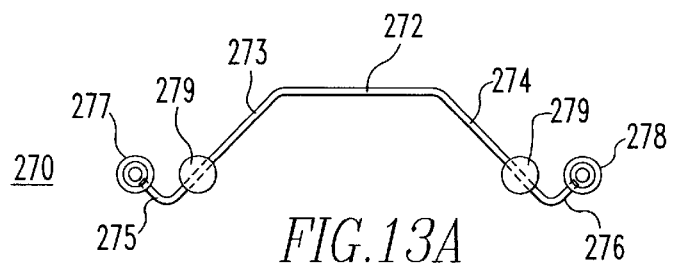
FIG. 13a is a top view of the slide plate and FIG. 13b is an elevational view of the slide plate.
Figure 13B:
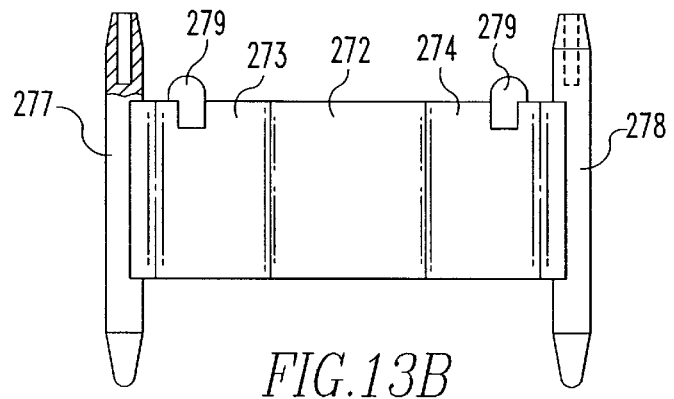
Figure 14:
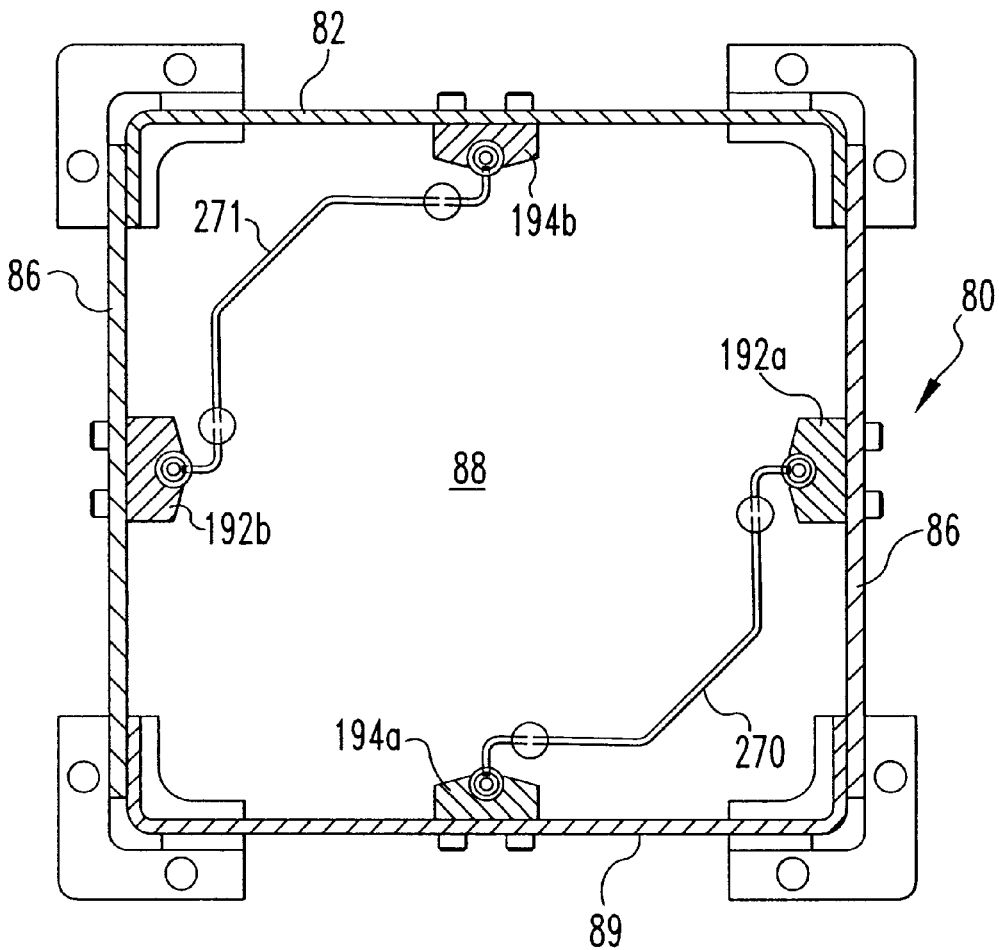
FIG. 14 is a top view of the slide plates disposed within the frame.

As shown on FIG. 13 each slide plate 270, 271 includes a base 272 and two sides 273, 274. The sides 273, 274 each have an outward turning tab 275, 276 which terminate in a cylindrical end 277, 278. Each side 273, 274 also has a projection 279 extending upwardly. The sides 273, 274 of the slide plate 270 are parallel to the sides of frame 80. The base 272 is at approximately 45 degrees from brace 86. As shown in FIG. 14, with this configuration, each slide plate is bent outwardly from the center of the frame cavity 88, thus allowing the gripper assembly 210 to easily pass between the slide plates 270. The cylindrical ends 2177, 278 of each slide plate 270 are disposed within a slide plate track 192*a*, 192*b*, 194*a*, 194*b* which are disposed on the lower portion of frame 80. Slide plate tracks 194*a*, 194*b* are mounted on either C-member 82, 84 of the frame assembly 80 while slide plate tracks 192*a*, 192*b* are mounted on the plurality of braces 86. Each slide plate track 192*a*, 192*b*, 194*a*, and 194*b* has a cylindrical channel 193*a*, 193*b*, 195*a*, 195*b*. The cylindrical ends 277, 278 of the two slide plates 270, 271 fit within the cylindrical channels 193*a*, 193*b*, 195*a*, 195*b*. Thus, as shown in FIGS. 4*a* and 4*b*, the slide plates 270, 271 are able to travel vertically in slide plate tracks 192*a*, 192*b*, 194*a*, and 194*b* between an upper position 196 and a lower position 197.

Figure 15A:
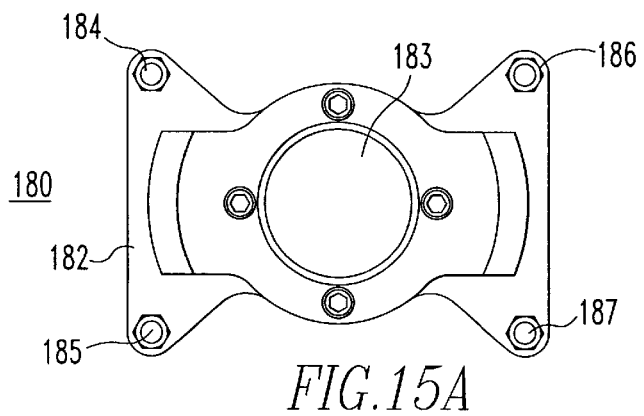
FIG. 15 is a detail of the pusher plate.
Figure 15B:
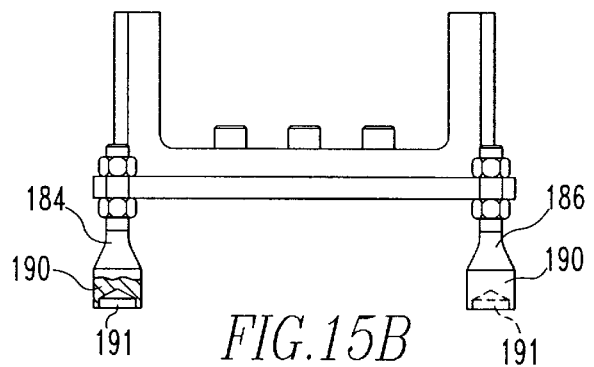

As shown on FIG. 15, the pusher plate 180 includes a flat member 182 having a medial hole 183. In the preferred embodiment, the flat member 182 is hour-glass shaped with a circular mid-section. At each corner of the plate 183 there is a downward extending projection 184, 185, 186, 187. As shown on FIG. 15*b* each downward projection 184, 185, 186, 187 has a cup shaped distal end 190 forming a cavity 191. The cavities 191 of the pusher plate projections 184, 185, 186 and 187 are shaped to fit on top of slide plate projections 279. Pusher plate 180 is horizontally mounted on inner tubular member 230 above gripper assembly 210. As the inner tubular member 230 is lowered, pusher plate 182 descends and cavities 191 will engage with a slide plate projections 279.

Cables 198, 199 are attached at one end to slide plates 170 and at the other end to the comb assembly 120, coupling the slide plate 170 to the comb assembly 120. The cables 198, 199 travel over pulleys 202, 204 which are mounted on pulley support plate 206. Pulley support plate 206 is attached to frame assembly 80 above the rail upper portion 170, 172 and above the slide plate tracks 192*a*, 192*b*, 194*a*, 194*b*. In operation, gravity will pull the comb assembly 120 downward into pedestal 110. As the comb assemblies 120 move downward, the cables 198, 199, which pass over pulleys 202 and 204, will draw each slide plate 270, 271 upwards to its upper position 196. As gripper assembly 210 and outer tubular member 230 descend to pick up a poison rod assembly 40, the pusher plate 182 on the inner tubular member 230 engages slide plate 270 causing slide plate 170 to travel downward in slide plate tracks 192*a*, 192*b*, 194*a* and 194*b*. As the slide plate 270 is pushed downward by pusher plate 180, the cables 198, 199 are drawn over pulleys 202 and 204 lifting the comb assembly 120. Each comb assembly 120 will be lifted from the lower position in the pedestal 110 to a position at the rail upper portion 170, 172. Thus, as gripper assembly 210 is lowered, each comb assembly 120 is raised to the comb rail upper end 170, 172 where the comb assembly 120 does not block the path of travel of gripper assembly 210. The location of pusher plate 180 on inner tubular member 230 can be adjusted so that each comb assembly 120 is removed from the path of travel of gripper assembly 210 just before the gripper assembly 210 or web 44 pass the comb assembly 120.

After the poison rod assembly 40 is inserted into a second fuel cell 20, the operator may turn handle 248 to unlatch the poison rod assembly 40 from gripper assembly 210. The operator may then raise the inner tubular member into its lower position 228 and use crane 60 to lift transfer device 70 off fuel cell 20.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of the invention which is to be given the full breath of the appended claims and any and all equivalence thereof.

What is claimed is:

1. A transfer device for moving a poison rod assembly between fuel cells in a nuclear fuel storage facility, said poison rod assembly having a plurality of poison rods disposed in rows, said device comprising:

a frame assembly;

a poison rod assembly lifting assembly moveable between an upper position and lower position;

plurality of slidable comb assemblies;

a comb assembly mounting means, slidably mounting said comb assemblies on said frame assembly, for sliding said comb assemblies between an open position and a closed position wherein said comb assembly mounting means mounts said plurality of comb assemblies to slide vertically and separate laterally; and wherein said comb assembly mounting means includes a coupling means for coupling said comb assemblies to said lifting assembly which is structured to slide said comb assemblies between said closed position and said open position as said lifting assembly moves between said upper position and said lower position.

2. The transfer device of claim 1, wherein:

said frame assembly has a lower end; and said comb assembly mounting means mounts said comb assemblies so that said open position of said comb assemblies is spaced above said lower end and said closed position is adjacent to said lower end.

3. The transfer device of claim 2 wherein said comb assembly mounting means includes a plurality of comb rails attached to said frame assembly.

4. The transfer device of claim 3, wherein:

said frame assembly forms a cavity;

said comb rails have an upper end and a lower end;

said upper end of said comb rails is disposed outside said frame assembly; and said lower end of said comb rails is disposed within said cavity.

5. The transfer device of claim 4, wherein:

said comb assemblies are coupled to said comb rails;

said comb rails are attached to said frame assembly so that said open position of said comb assemblies corresponds to said comb assemblies being located adjacent to said comb rail upper ends; and said comb rails are attached to said frame assembly so that said closed position of said comb assemblies corresponds to said comb assemblies being located adjacent to said comb rail lower ends.

6. The transfer device of claim 5, wherein said comb assembly mounting means positions said comb assemblies outside said frame assembly in said open position of said comb assemblies, and said comb assembly mounting means positions said comb assemblies within said frame assembly in said closed position of said comb assemblies.

7. The transfer device of claim 6, wherein:

each said comb rail forms a channel;

said comb assemblies each have at least one comb assembly projection; and said at least one comb assembly projection is disposed within said comb rail channel.

8. The transfer device of claim 7, wherein said frame assembly includes a pedestal attached to said lower end, said pedestal having a plurality of pedestal channels, each of which communicate with a comb rail channel and said comb assemblies engage said pedestal channels when said comb assemblies are in said closed position.

9. A transfer device for moving a poison rod assembly between fuel cells in a nuclear fuel storage facility, said poison rod assembly having a plurality of poison rods disposed in rows, said device comprising:

a frame assembly;

a poison rod assembly lifting assembly moveable between an upper position and a lower position;

a plurality of slidable comb assemblies;

a comb assembly mounting means, slidably mounting said comb assemblies on said frame assembly, for sliding said comb assemblies between an open position and a closed position; and said comb assembly mounting means mounts said plurality of comb assemblies to slide vertically and separate laterally.

10. The transfer device of claim 9, wherein said comb assembly mounting means includes:

a coupling means for coupling said comb assemblies to said lifting assembly which causes said comb assemblies to slide between said closed position and said open position as said lifting assembly moves between said upper position and said lower position.

11. The transfer device of claim 10, wherein:

said frame assembly has a lower end; and said comb assembly mounting means mounts said comb assemblies so that said open position of said comb assemblies is spaced above said lower end and said closed position is adjacent to said lower end.

12. The transfer device of claim 11 wherein said comb assembly mounting means includes a plurality of comb rails attached to said frame assembly.

13. The transfer device of claim 12, wherein:

said frame assembly forms a cavity;

said comb rails have an upper end and a lower end;

said upper end of said comb rails is disposed outside said frame assembly; and said lower end of said comb rails is disposed within said cavity.

14. The transfer device of claim 13, wherein:

said comb assemblies are coupled to said comb rails;

said comb rails are attached to said frame assembly so that said open position of said comb assemblies corresponds to said comb assemblies being located adjacent to said comb rail upper ends; and said comb rails are attached to said frame assembly so that said closed position of said comb assemblies corresponds to said comb assemblies being located adjacent to said comb rail lower ends.

15. The transfer device of claim 14, wherein said comb assembly mounting means positions said comb assemblies outside said frame assembly in said open position of said comb assemblies, and said comb assembly mounting means positions said comb assemblies within said frame assembly in said closed position of said comb assemblies.

16. The transfer device of claim 15, wherein:

each said comb rail forms a channel;

said comb assemblies each have at least one comb assembly projection; and said at least one comb assembly projection is disposed within said comb rail channel.

17. The transfer device of claim 16, wherein said frame assembly includes a pedestal attached to said lower end, said pedestal having a plurality of pedestal channels, each of which communicate with a comb rail channel and said comb assemblies engage said pedestal channels when said comb assemblies are in said closed position.

18. The transfer device of claim 17, wherein said frame assembly and said pedestal have a square cross section.

19. The transfer device of claim 11, wherein said comb assembly mounting means includes a comb assembly moving means.

20. The transfer device of claim 19, wherein said comb assembly moving means is disengagably coupled with said lifting assembly.

21. A transfer device for moving a poison rod assembly between fuel cells in a nuclear fuel storage facility, said poison rod assembly having a plurality of poison rods disposed in rows, said device comprising:

a frame assembly;

a poison rod assembly lifting assembly moveable between an upper position and a lower position;

a plurality of slidable comb assemblies;

a comb assembly mounting means, slidably mounting said comb assemblies on said frame assembly, for sliding said comb assemblies between an open position and a closed position;

said comb assembly mounting means mounts said plurality of comb assemblies to slide vertically and separate laterally;

said comb assembly mounting means includes a coupling means for coupling said comb assemblies to said lifting assembly which causes said comb assemblies to slide between said closed position and said open position as said lifting assembly moves between said upper position and said lower position;

said frame assembly has a lower end;

said comb assembly mounting means mounts said comb assemblies so that said open position of said comb assemblies is spaced above said lower end and said closed position is adjacent to said lower end;

said comb assembly mounting means includes a plurality of comb rails attached to said frame assembly;

said frame assembly forms a cavity;

said comb rails have an upper end and a lower end;

said upper end of said comb rails is disposed outside said frame assembly;

said lower end of said comb rails is disposed within said cavity;

said comb assemblies are coupled to said comb rails;

said comb rails are attached to said frame assembly so that said open position of said comb assemblies corresponds to said comb assemblies being located adjacent to said comb rail upper ends;

said comb rails are attached to said frame assembly so that said closed position of said comb assemblies corresponds to said comb assemblies being located adjacent to said comb rail lower ends;

said comb assembly mounting means positions said comb assemblies outside said frame assembly in said open position of said comb assemblies, and said comb assembly mounting means positions said comb assemblies within said frame assembly in said closed position of said comb assemblies;

each said comb rail forms a channel;

said comb assemblies each have at least one comb assembly projection;

said at least one comb assembly projection is disposed within said comb rail channel;

said frame assembly includes a pedestal attached to said lower end, said pedestal having a plurality of pedestal channels, each of which communicate with a comb rail channel and said comb assemblies engage said pedestal channels when said comb assemblies are in said closed position;

said frame assembly and said pedestal have a square cross section; and wherein said plurality of comb rails comprises eight rails mounted in pairs on each side of said frame assembly.

22. The transfer device of claim 21, wherein said plurality of comb assemblies comprises four comb assemblies, one each mounted in said pairs of comb rails.

23. A transfer device for moving a poison rod assembly between fuel cells in a nuclear fuel storage facility, said poison rod assembly having a plurality of poison rods disposed in rows, said device comprising:

a frame assembly;

a poison rod assembly lifting assembly moveable between an upper position and a lower position;

a plurality of slidable comb assemblies;

a comb assembly mounting means, slidably mounting said comb assemblies on said frame assembly, for sliding said comb assemblies between an open position and a closed position;

said comb assembly mounting means mounts said plurality of comb assemblies to slide vertically and separate laterally;

said comb assembly mounting means includes a coupling means for coupling said comb assemblies to said lifting assembly which causes said comb assemblies to slide between said closed position and said open position as said lifting assembly moves between said upper position and said lower position;

said frame assembly has a lower end;

said comb assembly mounting means mounts said comb assemblies so that said open position of said comb assemblies is spaced above said lower end and said closed position is adjacent to said lower end;

said comb assembly mounting means includes a comb assembly moving means;

said comb assembly moving means is disengagably coupled with said lifting assembly;

wherein said comb assembly moving means comprises:
  a pusher plate attached to said lifting assembly;
  at least one slide plate mounted on said frame assembly;
  a slide plate coupling means for coupling said at least one slide plate to said comb assemblies; and
  wherein said pusher plate engages said slide plate as said lifting assembly moves toward said lower position, pushing said slide plate toward said frame assembly lower end while said comb assemblies are lifted away from said frame assembly lower end by said slide plate coupling means.

24. The transfer device of claim 23, wherein:
  said slide plate coupling means is a plurality of cables each having two ends;
  each said cable is attached at one end to said at least one slide plate and at said other end to one of said plurality of comb assemblies; and
  a plurality of pulley assemblies attached to said frame assembly above said comb rails and above said slide plate, engaging said cables between said slide plate and said plurality of comb assemblies.

25. The transfer device of claim 24, wherein said moving means further includes a plurality of slide plate tracks attached to said frame assembly, where said at least one slide plate is coupled to said slide plate tracks.

26. The transfer device of claim 25, wherein:
  said at least one slide plate is coupled to said slide plate tracks and moves between an upper position on said slide plate track and a lower position on said slide plate track; and
  said cable is sized to position said comb assemblies in said closed position when said slide plate is in said slide plate upper position and said comb assemblies in said open position when said slide plate is in said slide plate lower position.

27. The transfer device of claim 26, wherein said pusher plate comprises:
  a plate having a plurality of projections extending downwardly;
  said projections terminating in cup-shaped cavities.

28. The transfer device of claim 27, wherein said slide plate comprises:
  a plate having a plurality of projections extending upwardly;
  said slide plate projections shaped to fit within said pusher plate projection cavities.

29. A transfer device for moving a poison rod assembly between fuel cells in a nuclear fuel storage facility, said poison rod assembly having a plurality of poison rods disposed in rows, said device comprising:
  a frame assembly;
  a poison rod assembly lifting assembly moveable between an upper position and a lower position;
  a plurality of slidable comb assemblies;
  a comb assembly mounting means, slidably mounting said comb assemblies on said frame assembly, for sliding said comb assemblies between an open position and a closed position;
  said comb assembly mounting means mounts said plurality of comb assemblies to slide vertically and separate laterally;
  said comb assembly mounting means includes a coupling means for coupling said comb assemblies to said lifting assembly which causes said comb assemblies to slide between said closed position and said open position as said lifting assembly moves between said upper position and said lower position;
  said frame assembly has a lower end;
  said comb assembly mounting means mounts said comb assemblies so that said open position of said comb assemblies is spaced above said lower end and said closed position is adjacent to said lower end;
  wherein said frame assembly includes:
    a pair of C-shaped members;
    a plurality of braces; and
    said C-shaped members held in spaced relation by said plurality of braces.

* * * * *